9023X
J. GOULDING.
HACKLING MACHINE.
Patented Aug. 17, 1835.
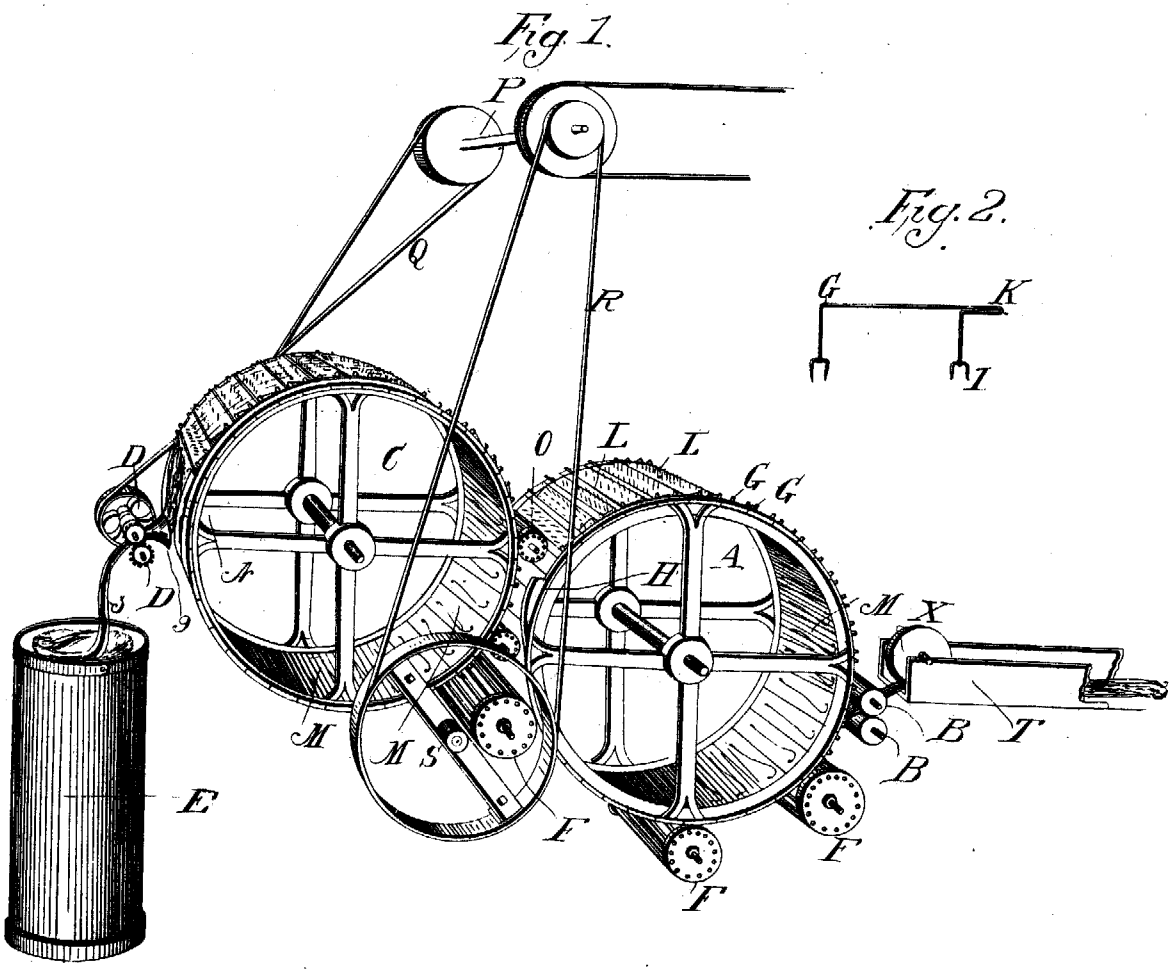
THE NORRIS PETERS CO., PHOTO-LITHO., WASHINGTON, D. C.

John Goulding, of Boston. Mss:
Letters Patent

The schedule referred to in these Letters Patent and making part of the same, containing a description in the words of the said John Goulding himself, of his improvement, in the mode of preparing & hatchelling hemp, flax, tow or manilla grass & producing thereby a continuous strain or sliver. –

---

To all persons to whom these presents shall come: I John Goulding of Boston in the County of Suffolk & Commonwealth of Massachusetts, machinist, sends greeting. Be it known that I the said John Goulding have invented, constructed made and applied to use a new & useful improvement in the mode of preparing & hatchelling hemp, flax tow or manilla grass, & producing thereby a continuous strain or sliver, specified & described in the words, figures & plates following & hereto annexed. Fig. 1st represents a breaker used to break prepare and hatchell the hemp, (flax or tow or grass) from which yarn is to be spun. T. is the trough into which the hemp is laid X is the roller under which the hemp passes from T. B.B. are rollers between which the hemp passes to be received by the first or receiving cylinder A. this cylinder has iron or steel teeth or pins L.L. projecting about two inches from its outer surface which may be put through wood or sett in iron or other metal, these pins are set in rows nearly across & all around the cylinder the pins equidistant & in quincunx order so that the pins in each row shall be neither exactly behind the pins in the preceding row nor exactly before the pins in the succeeding row. F.F.F. are rules with wires or rods running from head to head & fixed therein – G.G. are wires hung or fastned to the edges or rim of cylinder A. by staples (as in fig. 2 II. or by a joint & screw. these wires go across and upon the outer surface of the cylinder & between the rows of teeth or pins L.L. – H is a piece of iron or metal fixed upon the frame over which the wires pass as the cylinder revolves. M.M. are springs fastned upon the inside of said cylinder and attached through the surface of the cylinder by a stirrup to the wires G.G. so as to bring them back to their places on the outer surface of the cylinder after they have been raised by passing over the piece of metal H. C is the second cylinder which has teeth of iron or steel projecting from its surface about one half of an inch & set as described in cylinder A. but inclined slightly forward. C has wires corresponding to GG & springs corresponding to M.M. & a piece of iron or metal, K corresponding to H. on cylinder A. O (on cylinder C) is a reel corresponding to but smaller than F. on cylinder A. DD are rollers which convey the sliver 3. from cylinder C. g is a tunnel through which the sliver passes. E is a can to receive the sliver from DD. R is a band that goes round the pulley on shaft S & carries cylinders A & C. S is a shaft that has a gear on the other side that gears into cylinder C when the breaker is in operation the revolving motion of cylinder C is greater than that of A & in a degree proportioned to the requirement of the article to be manufactured & the two cylinders A & C. may be geared together so as to give them the relative motion required. The plates annexed hereto & above referred to represent one of my breakers adapted & applied to use preparing yarns from common Russia hemp or flax or tow or grass. The cylinders A & C (fig 1st) are about three feet in diameter & fourteen inches in width, the teeth or pins are set in seventy two rows each row contains ten teeth or pins and occupies about eight inches of the middle of the width of the cylinder so as to leave a vacant space of about three inches on each side or edge of the surface of the cylinder, cylinder C has one hundred & forty eight rows of teeth, and twenty teeth in a row, the rows set as in cylinder A. Cylinder C revolves about seventeen times to each revolution of cylinder A the other parts of the machine have the relative proportions exhibited on the plates. The process is as follows - the hemp 3. is weighed out in handfulls or parcels of about six oz each - each parcel is elongated by hand & laid in trough T on a revolving apron in layers, so that the end of each layer towards the breaker shall be about eighteen inches from that of the parcel or layer preceding it, the hemp is then passed from the trough T under the roller X & between the rollers BB and is received by & passes under cylinder A where it is crowded & pressed in among the teeth I.I. & down upon the wires GG by the rods or wires on the reels F.F.F. which turn in between the rows of teeth for that purpose. As the wires GG reach the piece of metal H they are raised by & pass over it successively & thus disengage & shove out the hemp from the teeth of the cylinder A so that it may be received by cylinder C. on to & over which it now passes the reel O presses the hemp among the

9023X teeth S S and on to the wires G G. as on cylinder A. as the wires reach the piece of metal N they are raised by & pass over it. & disengage the sliver or roving, so that it may be more easily drawn through the tunnel q by the callender rollers D D, which deliver it into can E. on both cylinders as the wires G G. pass over N & A. they are drawn back to their places by the springs M M. on the inside of the cylinder. Ten or more of the cans E filled with the sliver or roving 3 may be placed at the feeders B B. & the described process of hackelling may be repeated as often as may be necessary. The diameter of the cylinders must be varied according to the length of the staple of the article to be manufactured — a short staple; requiring a cylinder of a smaller diameter.

What I claim as my invention is the above described mode of preparing and hatchelling hemp, flax, tow or manilla grass, & producing thereby a continuous strain or sliver. In testimony that the above is a true specification of my said improvement I have hereto set my hand the twenty-fifth day of April. In the year of our Lord eighteen hundred & thirty-five —

Witnesses
John G. McKean
Edward G. Loring

John Goulding

[illegible]

1343 [illegible]

(Drawing.)